Jan. 21, 1969   W. G. DARLAND, JR., ET AL   3,423,247
POROUS CONDUCTIVE ELECTRODE HAVING AT LEAST TWO ZONES
Filed May 19, 1964

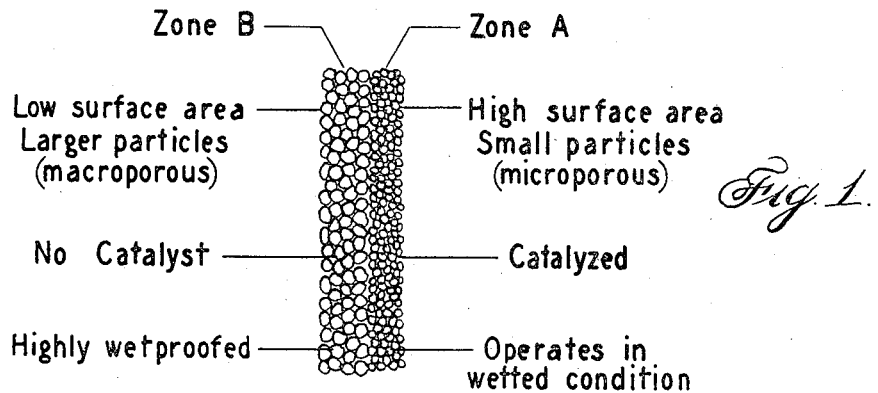

Fig. 1.

- Zone B — Zone A
- Low surface area / High surface area
- Larger particles (macroporous) / Small particles (microporous)
- No Catalyst / Catalyzed
- Highly wetproofed / Operates in wetted condition

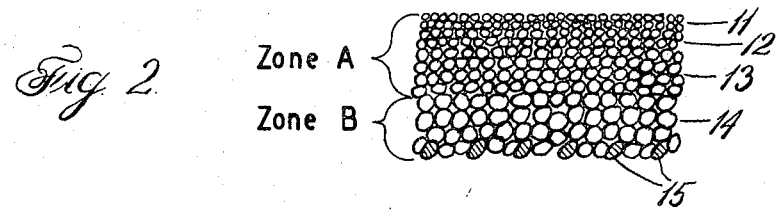

Fig. 2

Zone A { 11, 12, 13 }
Zone B { 14, 15 }

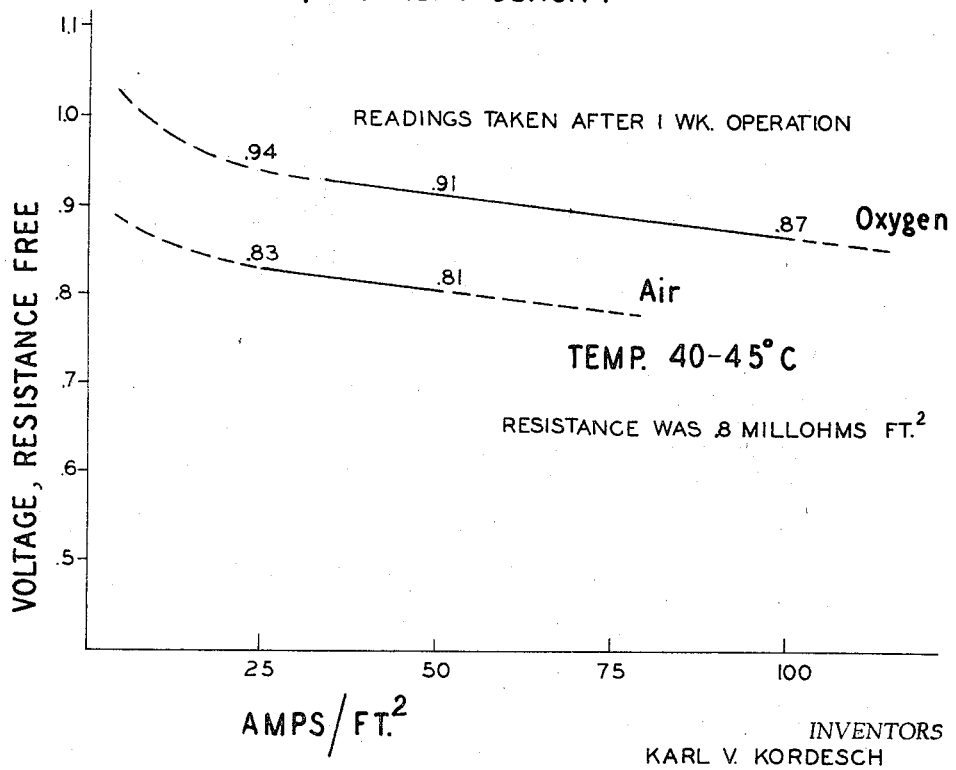

Fig. 3

VOLTAGE VS. CURRENT DENSITY

READINGS TAKEN AFTER 1 WK. OPERATION

.94 — .91 — .87 Oxygen
.83 — .81 Air

TEMP. 40-45°C

RESISTANCE WAS .8 MILLOHMS FT.$^2$

VOLTAGE, RESISTANCE FREE vs. AMPS/FT.$^2$

INVENTORS
KARL V. KORDESCH
WILLIAM G. DARLAND, JR.
JOHANNES A. VAN LIER
BY John F. Hohmann
ATTORNEY United States Patent Office 3,423,247
Patented Jan. 21, 1969

3,423,247
POROUS CONDUCTIVE ELECTRODE HAVING
AT LEAST TWO ZONES
William G. Darland, Jr., Parma, Karl V. Kordesch, Lakewood, and Johannes A. van Lier, Cleveland, Ohio, assignors to Union Carbide Corporation, a corporation of New York
Continuation-in-part of application Ser. No. 286,394, June 7, 1963. This application May 19, 1964, Ser. No. 370,394
U.S. Cl. 136—120                10 Claims
Int. Cl. H01m 13/02

This application is a continuation-in-part of copending application Serial No. 286,394 filed June 7, 1963, and now abandoned.

This invention relates generally to galvanic cells. More particularly, it relates to galvanic fuel cells and cells utilizing a depolarizing gas for operation, and to an improved electrode for use in cells of this type.

A fuel cell or a gas-depolarizable cell may be considered as a primary galvanic cell, the basic reaction of which is electrochemical oxidation. Fuel cells, however, differ from ordinary primary cells, such as the Le Clanche dry cell, in that the fuel and oxidant are generally introduced continuously into the cell electrodes during the production of electricity. In fuel cells, the electrodes and the electrolyte theoretically maintain a constant value while the fuel and oxidant react electrochemically and the electricity and reaction product are removed from the cell. In gas-depolarizable cells, a depolarizable cathode is exposed to a depolarizing gas which diffuses through the cathode to the cathode-electrolyte interface where an ionization reaction occurs. The cell generates a voltage which varies with the partial pressure of the depolarizing gas at the cathode. Typical depolarizing gases are oxygen, chlorine, the nitrogen oxides, and the like.

Many kinds of fuels and oxidants have been proposed in the past, including solids, liquids, and gases, and each type has been accompanied with its own particular problems. The present invention mainly concerns those cells using at least in part a gas as the fuel or oxidant. Such cells must have electrodes which provide gas-electrolyte-electrode interfaces. In general, electrodes for providing such interfaces have consisted of a porous material, such as porous nickel or carbon, which acts as a barrier to electrolyte on one side and permits the passage of gas into its interior from the other side. The common area where the gas, the electrolyte, and the electrode meet is the reaction zone.

For good cell performance, the electrolyte should penetrate into the electrode sufficiently to reach the interior surfaces of the electrode and thereby contact the gas in as many places as possible in the presence of the electrode and any catalyst therein. On the other hand, the electrode must be sufficiently electrolyte-repellent to prevent the electrolyte from flooding the pores of the electrodes and "drowning" the electrode. When drowning occurs, the reaction zone is moved away from the electrolyte side of the electrode deeper into the interior of the electrode, and a rather immobile electrolyte remains in the electrode pores between the reaction zone and the main body of electrolyte. Thus, the ions formed by the cell reaction cannot readily escape from the reaction zone, and the cell performance drops. This buildup of ions in the reaction zone and the resultant decrease in cell performance is known as "concentration polarization."

Heretofore, many attempts have been made to provide a fuel cell electrode which permits good gas-electrolyte-electrode contact without drowning or polarizing the electrode. For example, it has been proposed to make the pores on the electrolyte side of the electrode smaller than those on the gas side so that the combined effect of the surface tension of the liquid electrolyte in the small pores and the pressure of the gas prevents the electrolyte from flooding that portion of the electrode having the larger pores. However, the precise gas pressure control required by this method requires auxiliary equipment which detracts from the utility of the cell from the standpoint of size and weight. Moreover, this method encounters further difficulties in electrodes having irregular pore sizes, as in the conventional carbon electrodes.

It has also been proposed heretofore to wetproof the electrode, such as by dipping the electrode in a dilute solution of paraffin wax in a low boiling solvent. However, this method forms a film of paraffin which can cover many of the active centers on the electrode material. Since the working voltage and current of a gas electrode are largely determined by the number of active centers per unit of electrode surface, this wetproofing method has been limited to the use of very dilute solutions of wetproofing agent, e.g., solutions which deposit about 1 to 5 weight percent wetproofing agent on the electrode. Also, the wetproofing on the electrolyte side of the electrode tends to prevent penetration of the electrolyte into the pores of the electrode.

It is, therefore, the main object of the present invention to provide an improved electrode suitable for use in galvanic cells such as fuel cells and gas-depolarizable cells.

It is another object of the invention to provide such an electrode which permits some penetration of liquid electrolyte into the pores of the electrode and yet prevents electrode drowning.

It is a further object to provide such an electrode which does not require precise gas pressure control.

A still further object is to provide such an electrode with improved electrochemical activity.

Another object is to provide such an electrode which can be made extremely thin and flexible.

A further object is to provide unique processes for making such an electrode.

Other aims and advantages of the invention will be apparent from the following description and appended claims.

In the drawings:

FIG. 1 is a cross-section of a two-layer electrode made according to the invention.

FIG. 2 is a cross-section of a multi-layer electrode made according to the invention; and FIG. 3 is a graph showing the operating characteristics of the electrode of this invention in a hydrogen-oxygen fuel cell.

In accordance with the present invention, there is provided an electrode suitable for use in a fuel cell and as a cathode for a gas-depolarizable cell which electrode comprises a porous conductive body having at least two zones: a first zone, extending inwardly from the electrolyte side of the electrode, which is highly permeable to the liquid electrolyte and extremely active electrochemically; and a second zone, adjacent the first zone, which is gas-permeable and highly repellent to the liquid electrolyte. In the preferred form of the invention, each zone is made up of a plurality of layers so as to provide gradients of electrolyte repellency and electrochemical activity between the two surfaces. Proceeding from the electrolyte side to the gas side of the electrode, the electrolyte repellency increases, while the electrochemical activity decreases.

By providing an electrode having an active electrolyte-permeable zone and an adjacent gas-permeable, electrolyte-repellent zone, this invention provides an effective gas-electrolyte-electrode interface without electrode drowning. Not only can the liquid electrolyte penetrate into the electrode to reach the interior surface of the electrode, but there is also little or no wetproofing in this active layer of the electrode to cover the active centers of the electrode material. Moreover, since the active zone is adjoined by an electrolyte barrier zone which is repellent to liquid electrolyte, drowning of the electrode is effectively prevented without precise control of gas pressure.

In the preferred embodiment of the invention, there is also a differential in pore size through the electrode, with the larger pores being on the gas side of the electrode. This facilitates gas entry and water vapor removal on the gas side of the electrode, while inhibiting gas bubbling through the electrolyte side of the electrode.

A simple form of the inventive electrode is illustrated in FIG. 1. This electrode comprises two zones, each of which is made of a single layer. Zone A extends inwardly from the electrolyte side of the electrode, while zone B is located adjacent the inner boundary of zone A. Although the boundary between zone A and zone B is shown as a straight line, it will be understood that in practice this boundary may be irregular.

Zone A is made of a multiplicity of finely divided active particles having a high surface area, such as activated carbon, mixtures of carbon and fine metal powders. Activated carbon is the preferred material for a gas-depolarizable electrode. This zone is designed to be very active electrochemically and usually contains a catalyst, such as the platinum metals, to promote the electrochemical reactions. The active particles in zone A are bonded together by a suitable binder, such as a thermoplastic resin or carbonized pitch. This zone may also contain a small amount of wetproofing agent, depending on the particular method employed to wetproof the remainder of the electrode. In any event, however, it is important that zone A be permeable to liquid electrolyte and electrochemically active. For example, when the only liquid-repellent material in zone A is a thermoplastic binder, the concentration of binder should not be greater than about 33 volume percent at any point in this zone. When the only liquid-repellent is paraffin or a similar wetproofing agent, the paraffin concentration should never be greater than about 5 weight percent. The conductive particles in zone A should be very finely divided, such as carbon flour, to make the zone microporous and thereby inhibit the bubbling of gas therethrough. Thus, the average pore size in zone A is preferably in the range of about 0.1 to 1 micron.

Zone B differs from zone A in that it is repellent to liquid electrolyte, is not activated nor catalyzed, and is made of larger conductive particles to provide larger pore sizes. In other words, zone B is designed to be highly electrolyte-repellent and gas-permeable, but not electrochemically active. The repellency of zone B may be achieved by a number of different mechanisms. For example, this zone may be made of inherently liquid-repellent materials, such as powdered graphite or inactive metal powders, and/or the particles may be bonded together with relatively larger amounts of a repellent thermoplastic binder, such as polyethylene. Similarly, zone B may be made repellent by impregnating it with paraffin or other wetproofing agent. Zone B should have larger pore sizes than zone A so as to facilitate gas entry and water vapor removal. Thus, the pore sizes in zone B are preferably in the range of about 1 to 20 microns.

Both zone A and zone B should have a high electrical conductivity in order to keep the electrode resistance at a minimum. Thus, the conductive particles in both zones should be in electrical circuit with each other, such as by having the particles in contact with each other and/or by the use of a conductive binder.

The preferred thicknesses of the two zones in the subject electrode depend on a number of factors, such as the type of materials employed, the pore sizes, and the size and strength requirements for the electrode. The lower limit for the thickness of zone A is that which permits the electrolyte to penetrate into the electrode sufficiently to reach the interior surfaces of the electrode, while the upper limit is that which prevents the electrolyte from penetrating into the electrode sufficiently to cause electrode drowning. Specific examples of suitable zone thicknesses will be described below, but in general the thickness of zone A should be between 0.010 and about 0.065 inch. The only requirement on the thickness of zone B is that it be sufficient to prevent penetration of the electrolyte through the electrode. Of course, it is usually desirable to make zone B as thin as possible consistent with good repellency. It will be understood that zone B need not extend all the way to the gas surface of the electrode, as long as the zone is sufficiently thick to prevent penetration of the liquid electrolyte.

A multi-layer embodiment of the inventive electrode is shown in FIG. 2. Instead of having two single-layer zones with different properties, this electrode has a plurality of layers 11, 12, 13, and 14 which provide a gradient of electrolyte repellency and other properties through the porous body, the body being electrolyte-permeable at one end of the gradient and electrolyte-repellent at the other end of the gradient. Although zone A has been indicated as comprising the three layers 11, 12, and 13 and zone B as comprising the layer 14, it will be understood that since there is actually a gradient of properties through the composite body, there is no definite boundary between the zones in this type of electrode. The electrolyte surface of the electrode of FIG. 2 is the outside surface of layer 11, while the gas surface is the outside surface of layer 14. The four layers provide a gradation of electrolyte repellency, electrochemical activity, and pore size from one electrode surface to the other. Thus, proceeding from layer 11 to layer 14, the electrolyte repellency and pore size gradually increase, while the electrochemical activity decreases. This gradation of properties may be achieved by a variety of different electrode compositions, which will now be described in more detail in connection with the preferred methods of making the electrode of this invention.

One method of making the inventive electrodes is by thermoplastic bonding. This method can be illustrated by the following example of a particular thermoplastic bonding method for forming the electrode shown in FIG. 2. The starting compositions of the four layers of the electrode are as follows:

(1) Layer 11 comprises finely divided particles of activated carbon (−325 Tyler mesh, 0.0017 inch) mixed in paraffin oil. The thickness of the layer is about 0.001 to 0.002 inch. This layer initially contains no thermoplastic binder, but the particles become bonded to each other and to layer 12 during the molding process by the diffusion of a small amount of thermoplastic binder from layer 12.

(2) Layer 12 comprises activated carbon particles (−200+325 Tyler mesh, 0.0017 to 0.0029 inch) and about 1 to 10 volume percent polyethylene as the thermoplastic binder. The thickness of this layer is about 0.004 to 0.005 inch.

(3) Layer 13 comprises activated carbon particles (−65+200 Tyler mesh, 0.0082 to 0.0029 inch) and about 15 to 30 volume percent polyethylene. The thickness of this layer is about 0.011 to 0.014 inch.

(4) Layer 14 comprises graphite particles (−65+100 Tyler mesh, 0.0082 to 0.0058 inch) and about 10 to 49 volume percent polyethylene or 30 to 70 volume percent polytetrafluoroethylene. The thickness of this layer is from 0.015 to 0.018 inch. This layer may also include a suitable metal mesh or screen 15 as a support or current collector.

The molding procedure for the aforedescribed multilayer electrode is conventional and will be only briefly described herein. The mold will generally be designed to form a flat plate electrode, but the invention is applicable to any desired electrode shape. The inside lower surface of the mold is initially coated with a thin layer of the composition of layer 11. The mold cavity depth is then adjusted to 0.010 inch and a mixture of the layer 12 composition is leveled into the mold without pressure. The mold cavity depth is then readjusted to 0.040 inch total and the layer 13 composition leveled in without pressure, and then to 0.090 inch for the addition of the layer 14 composition. The mold cavity depth is finally adjusted to 0.250 inch, and the metal mesh 15 is laid on the layer 14. The mold is closed and heated to 450° F. for 30 minutes, and then quickly transferred to a hydraulic press and pressed at two tons per square inch. The mold is allowed to partially cool in the press at a much lower pressure, e.g., 0.5 ton per square inch.

In the above example, activated carbon is used in layers 11, 12, and 13, so each of these layers is electrochemically active. The plastic binder content increases with increasing particle size, but is always sufficiently small to avoid coating the active centers on the carbon particles. The electrolyte repellency of the various layers is determined mainly by the type of conductive particles and amount of plastic binder employed. Thus, layers 11, 12, and 13 are all permeable to the electrolyte, with the permeability decreasing somewhat from layer 11 to layer 13 due to the increasing plastic content. Layer 14 is highly repellent to the electrolyte because of the high plastic content and the use of graphite, which is inherently liquid repellent. The pore size depends mainly on the size of the particles employed, so the average pore size obviously increases from layer 11 to layer 14.

Layers 11 and 12 act mainly as a gas bubbling barrier, while the majority of the electrochemical activity takes place in layer 13. Ideally, all the pores of layer 11 are filled with electrolyte (completely saturated) while only some of the pores of layers 12 and 13 are filled, like a forest extending from soil into air. Layer 14 is extremely electrolyte repellent and serves to prevent drowning of the electrode. The large pores of layer 14 provide an easy path for the passage of gas to the active layers 11, 12, and 13, and for the removal of water vapor formed during the cell reaction.

The thermoplastic bonding method described above is preferred for making the inventive electrode for a number of reasons. For example, the desired properties in the different zones of the electrode can be controlled solely by adjusting the composition of the starting materials, without the need for any subsequent wetproofing or cleaning treatments. Moreover, this method permits accurate control of both the size and properties of the different zones even in extremely thin electrodes. The plastic bonded electrode is also highly flexible regardless of its thickness, thus minimizing the chances of electrode breakage.

There are many possible variations of the thermoplastic bonding method. For example, the electrode may be provided with any number of layers, as long as the layers on one side of the electrode form a zone which is electrochemically active and electrolyte-permeable and the layers adjacent the active zone form a zone which is highly electrolyte-repellent and gas-permeable. For instance, the active zone may be made of a finely divided high surface area metal powder, such as Raney nickel, while the electrolyte-repellent zone may be made of larger nonactive metal particles or a sintered metal plaque. Similarly, the active zone may be made of a mixture of powdered graphite and alumina having a high surface area and containing an appropriate catalyst. Of course, when the active layer is made of carbon, it should be catalyzed with a noble metal or other suitable catalyst.

A large number of thermoplastic materials are suitable for use as binding agents in the subject electrode. Examples of suitable materials are polyethylene, polypropylene, polychlorofluoroethylene, polytetrafluoroethylene, and various vinyl resins. Since the inherent liquid repellency of the thermoplastic materials varies somewhat, the exact amount of binder required may vary depending on the particular binder employed. In order to achieve a uniform mixture of the starting composition, it has been found to be desirable to dissolve polyethylene in hot toluene and then cool it to recrystallize the resin, as described in British Patent 571,814. This produces an extremely fine crystalline powder which can be uniformly mixed with the conductive particles. Also, both the conductive particles and the resin may be mixed in the hot toluene, so that the polyethylene precipitates directly on the surfaces of the conductive particles. After the electrode has been formed, it may be irradiated in order to harden the thermoplastic binder.

To illustrate the operating characteristics of the thermoplastic bonded electrodes of the invention, two electrodes made as described in the example above, (with layers 11, 12, and 13 catalyzed) were placed in a conventional hydrogen-oxygen fuel cell and operated at a terminal voltage of 0.92 volt, a current density of 50 amps/ft.$^2$, and a temperature of 50° C. The resistance-free voltage of this cell was 0.96 volt, indicating a cell resistance of 0.8 milliohm per square foot of cell. This is about the same as the resistance of a cell having one-quarter inch all-carbon electrodes with a $\frac{1}{32}$ inch electrolyte gap. Thus, the advantages of the thermoplastic bonded electrode can be attained without sacrificing cell resistance. Several cells of this type were operated for more than 1000 hours at 50 amps/ft.$^2$ with no apparent change in the electrode.

The operating characteristics of the fuel cell described above operating with air and oxygen as oxidant are shown in the graph in FIG. 3. As can be seen from FIG. 3, the electrodes of this invention are capable of running at high current densities for extended periods at high operating voltages. Also, the electrodes operate very well on air as compared with oxygen, which makes the electrodes extremely useful for practical cells in a variety of applications.

In another example, a hydrogen-oxygen fuel cell was provided with the aforedescribed thermoplastic bonded electrode as the cathode and a zinc anode. This cell was operated for 500 hours on oxygen at a current drain of 100 amps/ft.$^2$ with no apparent physical or electrochemical change in the cathode.

In a further example a carbon cathode material was prepared for a gas-depolarizable cell in the following manner. A sintered nickel plaque (0.035 inch thick, 80% porosity) containing an embedded nickel wire screen for additional support, was coated by spraying with a fluorocarbon resin. About 0.1 gram of the resin per square inch of the nickel plaque was applied, and the coated nickel plaque was then dried at about 100° C.

The coated nickel plaque was used as a substrate and sprayed with a slurry containing unactivated carbon (particle size: through 100 mesh) and an emulsion of a fluorocarbon resin (about 60 percent solids) so as to obtain a weight gain of about 0.12 gram of solids per square inch of the substrate after drying.

The resulting material was then heated at about 400° C. in an inert atmosphere for about two hours. The carbon-bearing surface of the material was then hot sprayed (at about 90° to 100° C.) with a toluene solution containing polyethylene (about 1 percent by weight) so as to give a thin coating of about 0.01 gram of polyethylene per square inch of the material. Subsequently three additional layers of a mixture of polyethylene and finely-divided activated carbon (through 200 mesh) in toluene were sprayed on. For the first of the three layers the weight ratio of polyethylene to activated carbon was 1:5, for the second layer the weight ratio was 1:8 and for the third layer the weight ratio was 1:13, respectively. These three layers represent the electrochemically active portion of the electrode.

The thus coated material was then hot pressed (about 45 p.s.i.g. steam) at 1000 p.s.i. The surface of the resulting cathode material was then catalyzed by applying thereto a solution of rhodium chloride and palladium chloride in isopropanol and thereafter heating the cathode material to a temperature sufficiently high to decompose the chlorides and deposit on the cathode material rhodium and palladium in a finely-divided active form.

Small gas depolarizable cells were assembled using cathodes made as described above, amalgamated zinc anodes and 9 N potassium hydroxide electrolyte containing about 2 weight percent of zinc oxide dissolved therein. These cells were operated as oxygen-sensing devices at about 70° C. with a 1000 ohm load and under a total gas pressure varying from about one to about three atmospheres. The oxygen partial pressure in the gas being analyzed varied from less than about 200 mm. of mercury to more than about 2000 mm. mercury. These cells exhibited very reliable and reproducible voltage outputs relative to the oxygen partial pressure over the entire range of conditions. Their performance was substantially superior to that of similar cells containing cathodes made by other techniques.

Another method of making the inventive electrode is by pre-forming the porous electrode with the desired electrochemical characteristics, impregnating the electrode with a wetproofing agent, and then preferentially removing the wetproofing agent from the active zone of the electrode. In this method, the pre-formed electrode may be made with or without a thermoplastic binder because the desired gradient of electrolyte repellency is achieved by controlling the location of the wetproofing agent in the electrode.

The electrode may be initially formed by a thermoplastic bonding method similar to that described above or by any of the conventional molding or extruding methods. Of course, the electrolyte side of the electrode must be made of an active material such as activated carbon, and is usually provided with a suitable anodic or cathodic catalyst. Also, as described above, the electrode is preferably provided with a smaller pore size on the electrolyte side than on the gas side.

The pre-formed electrode may be impregnated with the wetproofing agent by immersion in a bath, by vapor deposition, or any other suitable technique. In one embodiment of this method, the electrode is immersed in a bath of molten paraffin at a temperature well above the melting point of the paraffin, e.g., 150° C. The electrode is allowed to remain in the bath until it is thoroughly soaked with paraffin, i.e., until the electrode stops bubbling desorbed air. The electrode is then removed from the bath and slowly cooled.

After the electrode has been thoroughly impregnated with the desired wetproofing agent, it is further treated to remove a sufficient amount of the wetproofing agent from the active zone on the electrolyte side of the electrode to render that zone electrolyte-permeable and highly active. Of course, the remainder of the electrode must remain electrolyte-repellent. This removal of wetproofing agent significantly improves the electrochemical activity of the electrode. For example, whereas the impregnated electrode usually delivers less than 1 milliamp/cm.$^2$ in a fuel cell, the same electrode may deliver 100 milliamps/cm.$^2$ after the removal step. The wetproofing agent may be removed from the active electrode zone by several different methods. One such method is to heat the electrode in an oven at 200 to 250° C. while pressing the active surface of the electrode against a sheet of absorbent paper to absorb molten paraffin from the electrode. Whereas the original paraffin content of the soaked electrode may be as high as 20 to 30 weight per cent, a 30-minute heat treatment in contact with the absorbent material reduces the paraffin content to about 10 weight percent. The electrode is then cooled and immersed in petroleum ether or other suitable solvent to leach additional wetproofing agent from the active zone of the electrode and thereby insure that the active centers of the electrode material are not covered with wetproofing agent. Alternatively, the active zone of the electrode may be leached by passing it over a bath of heated refluxing solvent, such as petroleum ether, so that the solvent vapors act as the leaching agent. This method has the advantage that the solvent vapors are always free of the wetproofing agent.

Another method of removing the wetproofing agent from the active zone of the electrode is by vacuum distillation. For example, paraffin may be vacuum distilled from carbon electrodes by heating the electrode at a temperature of 180° C. under a vacuum of 10 microns.

Each of the methods described above for removing wetproofing agent from the active zone of the electrode removes more wetproofing agent from the outer portion of the zone than from the inner portion. Thus, there is a gradation of properties in the final electrode, similar to that described above in the electrode of FIG. 2. Proceeding from the electrolyte side to the gas side of the electrode, the electrolyte-repellency gradually increases, while the electrochemical activity gradually decreases. Of course, these properties can be controlled by varying the steps of adding and removing the wetproofing agent. After the wetproofing agent has been removed, the active zone of the electrode is preferably catalyzed, such as by impregnating it with a solution of a noble metal salt and then heating to the decomposition temperature of the salt to deposit the noble metal.

There are many possible variations in the wetproofing method described above. For example, the original soaking of the electrode may be carried out in concentrated solutions of paraffin in a solvent, e.g., 10 to 20 weight percent paraffin in kerosene, rather than in molten paraffin. Alternatively, the electrode may be impregnated with the wetproofing agent during the molding or forming operation. Also, another wetproofing agent, such as polyethylene, chloronaphthalene, or dibenzylether, may be used in place of the paraffin, as long as it can be leached or vacuum distilled from the active zone of the electrode. Of course, this method is applicable to both carbon and metal electrodes.

When electrodes made by the methods described above are employed in conventional hydrogen-oxygen fuel cells, they not only prevent electrode drowning over relatively long operating periods, but such cells also exhibit improved operating characteristics. For example, when used in a cell which produced 10 amps at 0.86 to 0.88 volt with carbon plate electrodes which were wetproofed by a prior art technique of soaking in 1.5 percent paraffin in petroleum ether, carbon eelctrodes prepared by the subject method (removal by absorption and leaching) produced 10 amps at 0.92 to 0.94 volt.

In an example of the vacuum distillation method, carbon plate electrodes were soaked in molten paraffin under vacuum, and then removed from the paraffin and heated at a temperature of 180° C. under a vacuum of 10 to 50 microns for 16 hours. The finished electrodes contained about 5 to 7 weight percent paraffin. The active zone on the electrolyte side of the electrode was permeable to liquid electrolyte, with the electrolyte repellency gradually increasing toward the gas side of the electrode. These electrodes were operated in conventional hydrogen-oxygen fuel cells at current densities of about 50 amps/ft.² for periods of 400 hours without a sign of electrode drowning. This compares with lifetimes of 50 hours at the same current density for electrodes which were wet-proofed by the prior art technique of soaking in 1.5 percent paraffin in petroleum ether.

The above electrodes were also not affected by gas reversal or high temperature operation. For example, the electrodes were heated to temperatures of 130° C. for short times and were subjected to gas inversion several times with no loss in performance.

In other examples of the vacuum distillation technique, carbon plate cathodes impregnated with 5 percent paraffin dissolved in high boiling kerosene and then subjected to vacuum distillation operated for 5000 hours at 50 amps/ft.², and similar anodes impregnated with paraffin oil and subjected to vacuum distillation operated for 3000 hours at 50 amps/ft.².

In another method for preparing the inventive electrodes by impregnating a pre-formed electrode with a wetproofing agent, the active zone of the electrode is initially treated to prevent the wetproofing agent from adhering to that zone. For example, a layer of sodium-carboxymethylcellulose or other suitable electrolyte-soluble material such as polyvinyl alcohol, polyethylene oxide, or the like may be deposited on the active surface of the electrode prior to the impregnating step. This material penetrates into the pores of the active zone, and the electrode is then impregnated with the wetproofing agent as described above. In this case, no removal of the wetproofing agent from the active zone is necessary. When the electrode is put into service the electrolyte-soluble material is dissolved in the electrolyte. The resulting electrode has a highly active layer on the electrolyte side, with the remainder of the electrode being highly electrolyte repellent.

In any of the aforedescribed methods involving impregnation of a pre-formed electrode with a wetproofing agent, it is preferred to clean the electrode by heat and vacuum to remove volatile impurities therefrom prior to the impregnating step. This has been found to facilitate the wax impregnation and enhances the electrochemical activity of the active electrode zone. Moreover, the vacuum cleaning has been found to permit the use of a broader range of wetproofing solutions. For example, vacuum-cleaned carbon electrodes have been wetproofed by soaking in a solution of about 5 percent paraffin dissolved in high-boiling kerosene (200–240° C.). The vacuum cleaning removed traces of volatile solvents from the carbon and made the paraffin-kerosene solution adhere firmly to the surface of the carbon particles. Subsequent vacuum distillation removed most of the kerosene. Such electrodes operated for periods of 500 hours at 50 amps/ft.² in a conventional hydrogen-oxygen fuel cell. Other electrodes were treated in the same manner but using paraffin oil as the wetproofing solution. The electrodes operated for 3000 hours at a current density of 50 amps/ft.² in a hydrogen-oxygen fuel cell. This is in marked contrast to electrodes treated with paraffin oil without any vacuum treatment. Such electrodes show poor electrochemical activity and operate for only short periods at low current densities.

When the electrodes of this invention are to be used as oxygen electrodes, it is preferred to use non-oxidizable wetproofing agents, such as chlorinated paraffin or polychlorofluoroethylene oil. To achieve good performance from electrodes wetproofed with the polychlorofluoroethylene oil, the soaked electrode should be subjected to a vacuum distillation treatment at a temperature of 180° C. and a vacuum of 50 microns.

While various specific forms of the present invention have been illustrated and described herein in some detail, it will be understood that the same are susceptible of numerous modifications within the scope of the invention. For example, although the invention has been described with particular reference to electrodes made from finely divided particles or powders, the invention is equally applicable to other porous electrode structures, such as fibrous structures. Also, although several different methods have been described for making the inventive electrode, these methods need not be practiced independently, i.e., the methods may be combined with each other to produce the desired electrode properties. For example, the electrode may be initially made partially repellent by the use of a thermoplastic binder and/or inherently repellent materials, and then subsequently wetproofed by the addition of paraffin or some other wetproofing agent. Further, instead of forming the electrodes by molding procedures, they may be formed by paint spraying techniques followed by hot pressing.

We claim:

1. An electrode which comprises a porous conductive carbon body having at least two zones; a first zone extending inwardly from one surface of said body and being electrochemically active and permeable to liquid electrolyte; and a second zone adjacent said first zone and being repellent to liquid electrolyte and gas-permeable; said first zone comprising a plurality of adjacent layers, each of said layers being more electrolyte-repellent and less electrochemically active than the next outer layer adjacent thereto.

2. An electrode which comprises a porous conductive carbon body having at least two zones; a first zone extending inwardly from one surface of said body and being electrochemically active and permeable to liquid electrolyte; and a second zone adjacent said first zone and being repellent to liquid electrolyte and gas-permeable; said first zone comprising a plurality of adjacent layers, each of said layers being more electrolyte-repellent and less electrochemically active than the next outer layer adjacent thereto, and said first zone having a smaller average pore size than the remainder of said porous body.

3. The electrode of claim 2 wherein said first zone has an average pore size of between about 0.1 micron and about 1 micron and the remainder of said porous body has an average pore size of between about 1 micron and about 20 microns.

4. The electrode of claim 2 wherein the thickness of said electrolyte-permeable first zone is between about 0.010 inch and about 0.065 inch.

5. The electrode of claim 2 wherein said first zone contains a catalyst.

6. An electrode which comprises a porous body of finely divided conductive carbon particles bonded together by a thermoplastic binder, said body having a first zone which is electrochemically active and extends inwardly from one surface of said body, the proportion of thermoplastic binder in said first zone being sufficiently small to make said first zone permeable to liquid electrolyte, said first zone being made of a plurality of layers, each of said layers containing a larger proportion of thermoplastic binder than the next outer layer adjacent thereto so as to provide a gradient of electrolyte repellency through said first zone; said body having a second and gas-permeable zone adjacent said first zone, the proportion of thermoplastic binder in said second zone being sufficiently great to make said second zone repellent to liquid electrolyte; and said first zone having a smaller average pore size than said second zone.

7. The electrode of claim 6 wherein the proportion of thermoplastic binder in said first zone is less than about 33 volume percent.

8. The electrode of claim 6 wherein the average pore size in said first zone is between about 0.1 micron and about 1 micron and the average pore size in said second zone is between about 1 micron and about 20 microns.

9. An electrode which comprises a porous conductive body having at least two zones: a first zone extending inwardly from one surface of said body, being permeable to liquid electrolyte, and containing electrochemically active particles which are activated carbon, and a second zone adjacent to said first zone, repellent to liquid electrolyte, and containing graphite particles.

10. An electrode which comprises a first zone which is made up of three layers of finely-divided activated carbon held together with polyethylene and a second zone adjacent to the first zone which is made up of unactivated carbon particles held together with a fluorocarbon resin and supported on a sintered nickel plaque.

References Cited

UNITED STATES PATENTS

| | | | |
|---|---|---|---|
| 3,040,115 | 6/1962 | Moos | 136—120 |
| 3,113,048 | 12/1963 | Thompson | 136—120 |
| 3,226,263 | 12/1965 | Oswin | 136—120 |
| 3,062,909 | 11/1962 | Reutschi | 136—86 |
| 3,098,762 | 7/1963 | Roblee et al. | 136—86 |
| 3,160,527 | 12/1964 | Hess | 136—120 |
| 3,101,285 | 8/1963 | Tantram et al. | 136—120 |

WINSTON A. DOUGLAS, *Primary Examiner.*

A. SKAPARS, *Assistant Examiner.*

U.S. Cl. X.R.

136—121